US009405568B2

(12) United States Patent
Garg et al.

(10) Patent No.: US 9,405,568 B2
(45) Date of Patent: Aug. 2, 2016

(54) MULTI-TENANT NETWORK STACK

(71) Applicant: Microsoft Technology Licensing, LLC, Redmond, WA (US)

(72) Inventors: Pankaj Garg, Bellevue, WA (US); Onur Feliz, Redmond, WA (US); Luis M. Hernandez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 14/027,025

(22) Filed: Sep. 13, 2013

(65) Prior Publication Data
US 2015/0082301 A1    Mar. 19, 2015

(51) Int. Cl.
G06F 15/173 (2006.01)
G06F 9/455 (2006.01)
H04L 12/751 (2013.01)
H04L 12/24 (2006.01)

(52) U.S. Cl.
CPC ............ *G06F 9/45533* (2013.01); *H04L 41/12* (2013.01); *H04L 45/02* (2013.01)

(58) Field of Classification Search
CPC ................................ H04L 29/06; H04L 45/00
USPC ......................................................... 709/238
See application file for complete search history.

(56) References Cited

U.S. PATENT DOCUMENTS

| 7,953,865 | B1 * | 5/2011 | Miller ................. H04L 12/6418 370/254 |
| 8,315,156 | B2 * | 11/2012 | Droux ................... H04L 45/245 370/216 |
| 8,374,183 | B2 | 2/2013 | Alkhatib et al. |
| 8,412,809 | B2 * | 4/2013 | Ruan ....................... H04L 12/24 370/401 |
| 2008/0002663 | A1 * | 1/2008 | Tripathi .................. H04L 45/00 370/351 |
| 2009/0327471 | A1 * | 12/2009 | Astete ................. G06F 9/45533 709/223 |
| 2011/0075664 | A1 * | 3/2011 | Lambeth ................. H04L 45/04 370/390 |
| 2011/0090910 | A1 * | 4/2011 | Tripathi .................. H04L 49/00 370/395.1 |
| 2012/0233611 | A1 | 9/2012 | Voccio |
| 2012/0266231 | A1 | 10/2012 | Spiers et al. |

(Continued)

OTHER PUBLICATIONS

"Cisco Virtualized Multi-Tenant Data Center Framework", Available at <http://www.cisco.com/en/US/docs/solutions/Enterprise/Data_Center/VMDC/2.2/vmdcframework.pdf>, (May 18, 2012), 14 pages.
Rao, Ravi "Cloud Scale Multitenant Networking Stack", Retrieved from: <<http://blogs.technet.com/b/networking/archive/2013/08/03/cloud-scale-multitenant-networking-stack-and-service.aspx>> on Sep. 12, 2013 (Aug. 2, 2013), 4 pages.

(Continued)

*Primary Examiner* — Vivek Srivastava
*Assistant Examiner* — Atta Khan
(74) *Attorney, Agent, or Firm* — Judy Yee; Micky Minhas

(57) ABSTRACT

Multi-tenant network stack techniques are described. In an implementation, a host instantiates an instance of virtual machine that is configured to serve networks service to multiple tenants and corresponding virtual networks. To do so, a framing layer of the virtual machine may be configured to obtain configuration data indicative of topology for a multi-tenant virtual networking environment from a virtual switch of a host device. The framing layer uses the configuration data to construct routing compartments and interfaces as abstractions of each virtual network in accordance with the topology. The routing compartments are isolated from each other and provide a mechanism for applications to process network input/output (I/O) in the context of a specific tenant or virtual network. The single virtual machine is able to provide services and applications to serve multiple tenants that are independent of the underlying virtualization technology.

20 Claims, 7 Drawing Sheets

(56) References Cited

U.S. PATENT DOCUMENTS

| | | | |
|---|---|---|---|
| 2013/0067485 A1 | 3/2013 | Shamilian et al. | |
| 2013/0142201 A1* | 6/2013 | Kim | H04L 12/4633 370/392 |
| 2013/0145006 A1 | 6/2013 | Tammam | |
| 2014/0344459 A1* | 11/2014 | Kludy | H04L 41/0893 709/226 |

OTHER PUBLICATIONS

Williams, CJ "What's New in Hyper-V Network Virtualization in R2", Retrieved from: <http://blogs.technet.com/b/networking/archive/2013/07/31/what-s-new-in-hyper-v-network-virtualization-in-r2.aspx> on Sep. 6, 2013, (Jul. 31, 2013), 4 pages.

* cited by examiner

600

602
Receive a packet routed from a virtual switch to an instance of virtual machine configured to support multi-tenant services for multiple virtual networks

604
Parse the packet to ascertain an identifier indicative of a particular virtual network of the multiple virtual networks serviced by the virtual machine

606
Determine based upon the identifier an interface of a routing compartment corresponding to the particular virtual network configured for handling of the packet in isolation from other virtual networks serviced by the virtual machine

608
Direct the packet for handling via the interface within the routing compartment

*Fig. 6*

MULTI-TENANT NETWORK STACK

BACKGROUND

Network virtualization technologies such as Network Virtualization using Generic Routing Encapsulation (NVGRE) or Virtual Local Area Network (ULAN) enable service providers to create virtual, cloud based networks for their customers or "tenants" that are independent of the physical network and underlying hardware for their customers. Such virtual networks may be created on-demand without changes to the underlying physical network. Virtual networks are therefore relatively easy to set-up, manage and expand and may have a cost advantage over comparable physical networks.

Traditionally, a dedicated virtual machine instance is configured by a service provider for each tenant and/or virtual network to provide the tenant with network services (such as gateways, firewalls, load balancers, DHCP servers, and so forth.). Traditional networking stacks are unable to handle overlapping constructs such as internet protocol (IP) addresses from multiple virtual networks and therefore the dedicated virtual machine cannot serve multiple virtual networks. Additionally, traditional networking stacks lack functionality to isolate one virtual network's traffic from another. Thus, set-up and management of a virtual machine for network services is duplicated for each tenant. As more and more tenants migrate their workloads to a service provider's virtualization service, the capital expenditure and operating costs associated with providing dedicated virtual machines associated with each virtual network increases accordingly. Thus, existing techniques for handling multiple tenant workloads in a virtual networking environment may be inefficient and/or inadequate in some instances.

SUMMARY

Multi-tenant network stack techniques are described. In an implementation, a host instantiates an instance of virtual machine that is configured to provide networks services to multiple tenants and corresponding virtual networks. To do so, a framing layer of the virtual machine may be configured to obtain configuration data indicative of topology for a multi-tenant virtual networking environment from a virtual switch of a host device. The framing layer uses the configuration data to construct routing compartments and interfaces as abstractions of each virtual network in accordance with the topology. The routing compartments are isolated from each other and provide a mechanism for applications to process network input/output (I/O) in the context of a specific tenant or virtual network. The single virtual machine is able to provide services and applications to serve multiple tenants that are independent of the underlying virtualization technology.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 6 is a flow diagram depicting an example procedure for routing packets in a multi-tenant network stack in accordance with one or more implementations.

DETAILED DESCRIPTION

Overview

Traditional networking stacks are unable to handle overlapping constructs such as internet protocol (IP) addresses from multiple virtual networks and lack functionality to isolate one virtual network's traffic from another. Therefore an instance of a virtual machine cannot serve multiple virtual networks.

Multi-tenant network stack techniques are described. In an implementation, a host instantiates an instance of virtual machine that is configured to serve networks service to multiple tenants and corresponding virtual networks. To do so, a framing layer of the virtual machine may be configured to obtain configuration data indicative of topology for a multi-tenant virtual networking environment from a virtual switch of a host device. The framing layer uses the configuration data to construct routing compartments and interfaces as abstractions of each virtual network in accordance with the topology. The routing compartments are isolated from each other and provide a mechanism for applications to process network input/output (I/O) in the context of a specific tenant or virtual network. The single virtual machine is able to provide services and applications to serve multiple tenants that are independent of the underlying virtualization technology. The multi-tenant network stack may support various virtualization technologies including at least NVGRE and VLAN. Additionally, the single virtual machine may be configured to serve virtual networks and construct routing compartments that use a combination of different supported virtualization technologies.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Lastly, an example system and components of the system are discussed that may be employed to implement embodiments of the techniques described herein.

Example Environment

Figure 1:
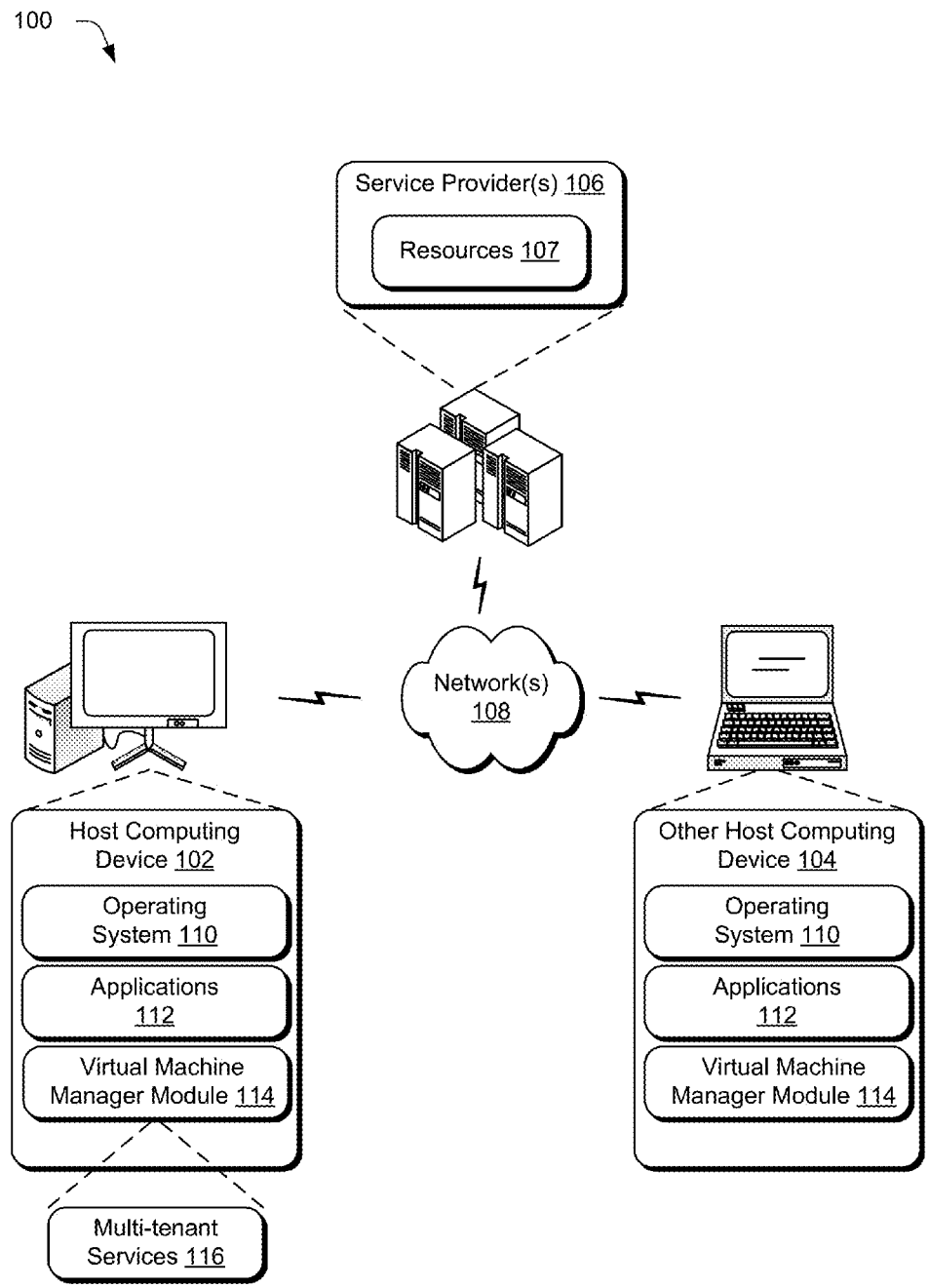
FIG. 1 is an illustration of an example operating environment in accordance with one or more implementations.

FIG. 1 is an illustration of an environment 100 in an example implementation that is operable to employ techniques described herein. The illustrated environment 100 includes a host computing device 102, an other host computing device 104, and a service provider 106 that are communicatively coupled via a network 108. The host computing device 102, other host computing device 104, and service provider 106 may be implemented by one or more computing devices and also may be representative of one or more entities. Host computing devices 102 and 104 may also represent a virtual machine in a virtual networking environment additional details of which are discussed in relation to FIG. 2 below.

The service provider 106 may make a variety of resources 107 (e.g. content and services) available to clients of the network 108, which may include the hosts in some instances. Generally, resources 107 made accessible by a service provider 106 may include any suitable combination of services and/or content typically made available over a network by one or more providers. Some examples of services include, but are not limited to, a virtual networking service (e.g., cloud computing), a search service, an email service, an instant messaging service, an online productivity suite, and an authentication service to control access of clients to the resources. Content may include various combinations of text, multi-media streams, documents, application files, photos, audio/video files animations, images, web pages, web applications, device applications, content for display by a browser or other client application, and the like.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, provide a datacenter, and so on. Further examples of computing systems and devices suitable to implement techniques described herein are described below in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The host computing device 102 and other host computing device 104 are each illustrated as including an operating system 110. The operating system 110 is configured to abstract underlying functionality of the underlying device to applications 112 that are executable by the hosts. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with hosts are contemplated including, but not limited to, a productivity suite that integrates multiple office productivity modules, a web browser, games, a multi-media player, a word processor, a spreadsheet program, a photo manager, and so forth.

The hosts are also illustrated as each including a virtual machine manager module 114. The virtual machine manager module 114 represents functionality to manage the creation, operation, and termination of virtual machines. The virtual machine manager module 114 is also configured to enable multi-tenant network stack techniques described herein. For example, the virtual machine manager module 114 may be adapted to facilitate provision of multi-tenant services 116 by virtual machines managed via the virtual machine manager module 114. As described in greater detail below, the virtual machine manager module 114 may instantiate a virtual machine that implements a multi-tenant network stack. A single virtual machine may service multiple virtual networks (also referred to as tenant networks or routing domains) corresponding to different tenants/customers. In one approach, constructs referred to as routing compartments corresponding to each virtual network serviced by a virtual machine are created in the network stack to abstract network layer state and isolate the virtual networks from one another. Multi-tenant services 116 and corresponding applications may therefore operate and handle network input/output (I/O) within the context of a particular virtual network using an appropriate routing compartment. The support for multi-tenancy provided via the virtual machine manager module 114 and routing compartments may be independent of network virtualization technology employed for the virtual networks. Additionally, multiple different network virtualization technologies may be supported by the same instance of a virtual machine. Details regarding these and other aspects of multi-tenant network stack techniques are discussed in relation to the following figures.

In general, multi-tenant network stack techniques described above and below may be implemented by physical devices and components (e.g., routers and switches) as well as by virtual machines, switches, and other components in a virtual networking environment. Naturally, combinations of physical and virtual machines/devices are also contemplated. In the following discussion, some examples and details are discussed in relation to a virtual networking environment that may include multiple virtual machines. The described techniques, however, are equally applicable to networks of physical computing devices and "mixed" networks that include a mix of physical computing devices and virtual machines. For example, the multi-network stack as described herein in a virtual machine context may alternatively be implemented natively by a traditional physical computing environment.

Figure 2:
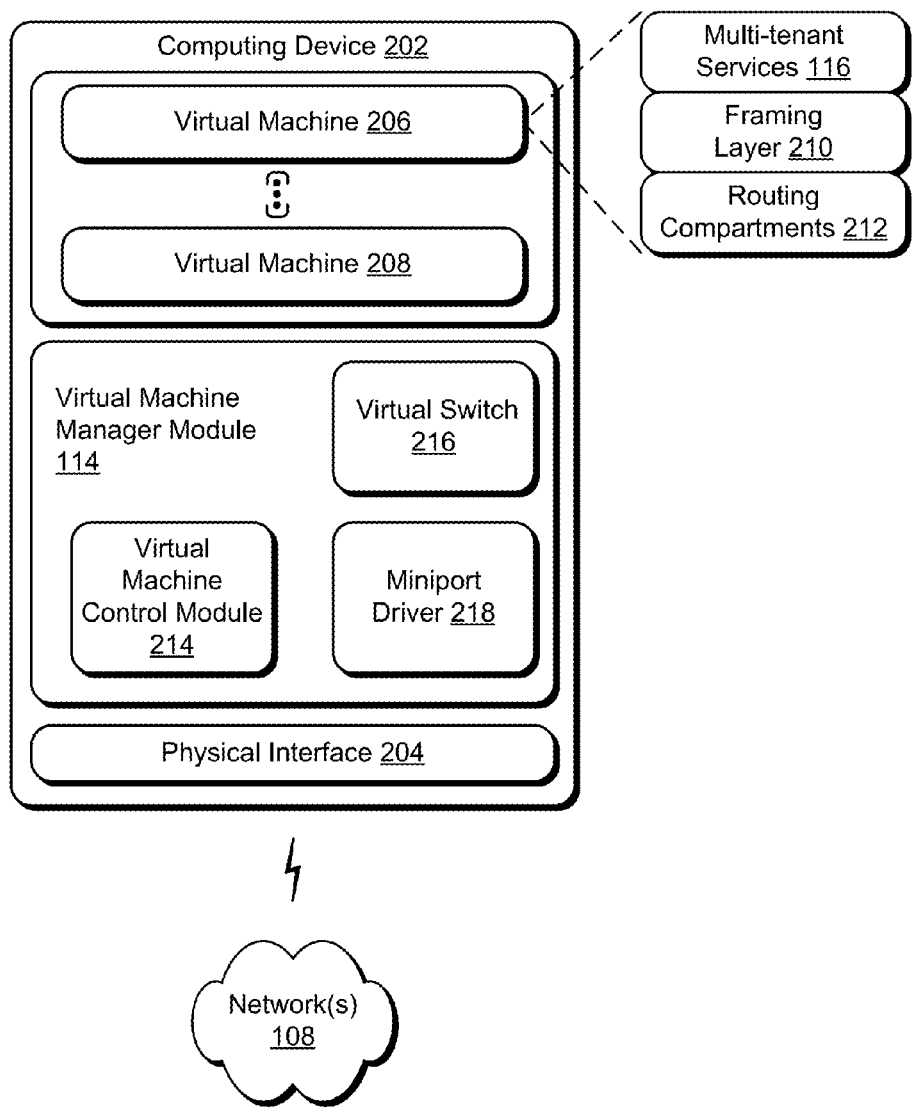
FIG. 2 is a diagram depicting an example virtual networking environment in accordance with one or more implementations.

To further illustrate techniques for a multi-tenant network stack, consider now FIG. 2, which depicts a diagram showing generally at 200 an example virtual networking environment in which techniques described herein may be implemented. The example virtual networking environment includes a computing device 202 having a physical interface 204, a virtual machine manager module 114, and one or more virtual machines 216, . . . , 208.

As noted previously, virtual machine manager module 114 is representative of functionality to manage the creation, operation, and termination of virtual machines 206, 208, including access to the functionality provided by the physical interface 204 for virtual machines 206, 208. The physical interface 204 is representative of a communication component, such as a wired and/or wireless network adapter (e.g., network interface card (NIC)). Although a single physical interface 204 is illustrated in FIG. 1, it should be noted that computing device 202 can include multiple physical interfaces of the same and/or different types, and that virtual machine manager module 114 can manage access to the functionality provided by those multiple physical interfaces.

Thus, virtual machine manager module 114 allows one or more virtual machines 206, 208 to run on respective computing devices or hosts. Any number of virtual machines can run be on a particular host computing device. A virtual machine refers to a software implementation of a computing device (or other machine or system) that is configured to execute programs analogous to a physical computing device. Each virtual machine 206, 208 for instance, may execute an operating system and other applications, and each such operating system and application may be executed without being aware that this execution occurs using a virtual machine and thus this execution may occur without specialized configuration of the applications and other software.

Virtual machine manager module 114 is illustrated as including a virtual machine (VM) control module 214, a virtual switch 216, and a miniport driver 218. The virtual machine control module 214 is representative of functionality to manage the execution of virtual machines. This management may include whether to allow the virtual machines to be run (launched) and terminated, controlling migrating of virtual machines from one computing device to another (e.g., between computing device 202 and other computing devices via network 108), and so forth.

As represented in FIG. 2, a virtual machine may be configured to provide multi-tenant services 116. In order to do so, the virtual machine may include or make use of a framing layer 210 that is multi-tenant aware. The framing layer 210 may be configured to create and manage routing compartments 212 to isolate multiple virtual networks serviced by the virtual machine and operate as an abstraction of state information for virtual networks and virtualization technologies employed by the virtual networks. Routing compartments 212 and/or corresponding interfaces contained in the compartment may be associated with isolation identifiers that may be employed to distinguish between and isolate traffic for the different compartments/interfaces. In one approach, the framing layer 210 may query configuration data maintained by the virtual switch 216 to understand a topology of the virtual networks for the virtual machine and create routing compartments 212 and related components for the virtual machine to implement multi-tenant support. Details regarding the framing layer 210, routing compartments 212, and other components of a multi-tenant network stack are described below.

The virtual switch 216 is configured to allow the virtual machines to communicate with one another as well as optionally other physical devices via physical interface 204 and network 108. In some implementations, the virtual switch 216 is extensible and therefore may be configured to allow different extensions to be added to enhance or modify capabilities of the virtual switch 216. For example, the virtual switch 216 may be extended to implement aspects of multi-tenant network stack techniques described herein.

The miniport driver 218 is representative of an interface that is configured to provide operations specific to physical interface 204 and allow virtual switch 216 to communicate with physical interface 204. Although a single miniport driver 218 is illustrated, multiple miniport drivers 218 may be provided for computing devices having multiple physical interfaces 204, with one miniport driver corresponding to each physical interface 204.

Having considered an example environment, consider now a discussion of some example details of multi-tenant network stack techniques in accordance with one or more embodiments.

Multi-Tenant Network Stack Details

The following discussion describes details of multi-tenant network stack techniques that may be implemented utilizing the previously described systems and devices including some example implementations of a multi-tenant virtual machine architecture and some example procedures. In portions of the following discussion, reference may be made to the environment 100 of FIG. 1 and the environment 200 of FIG. 2. Aspects of each of the procedures herein may be implemented in hardware, firmware, or software, or a combination thereof. The procedures are shown as a set of blocks that specify operations performed by one or more devices and are not necessarily limited to the orders shown for performing the operations by the respective blocks. In at least some embodiments, the procedures may be performed by a suitably configured computing device, such as a host or virtual machine that includes or otherwise makes use of a virtual machine manager module 114.

Multi-Tenant Architecture

Figure 3:
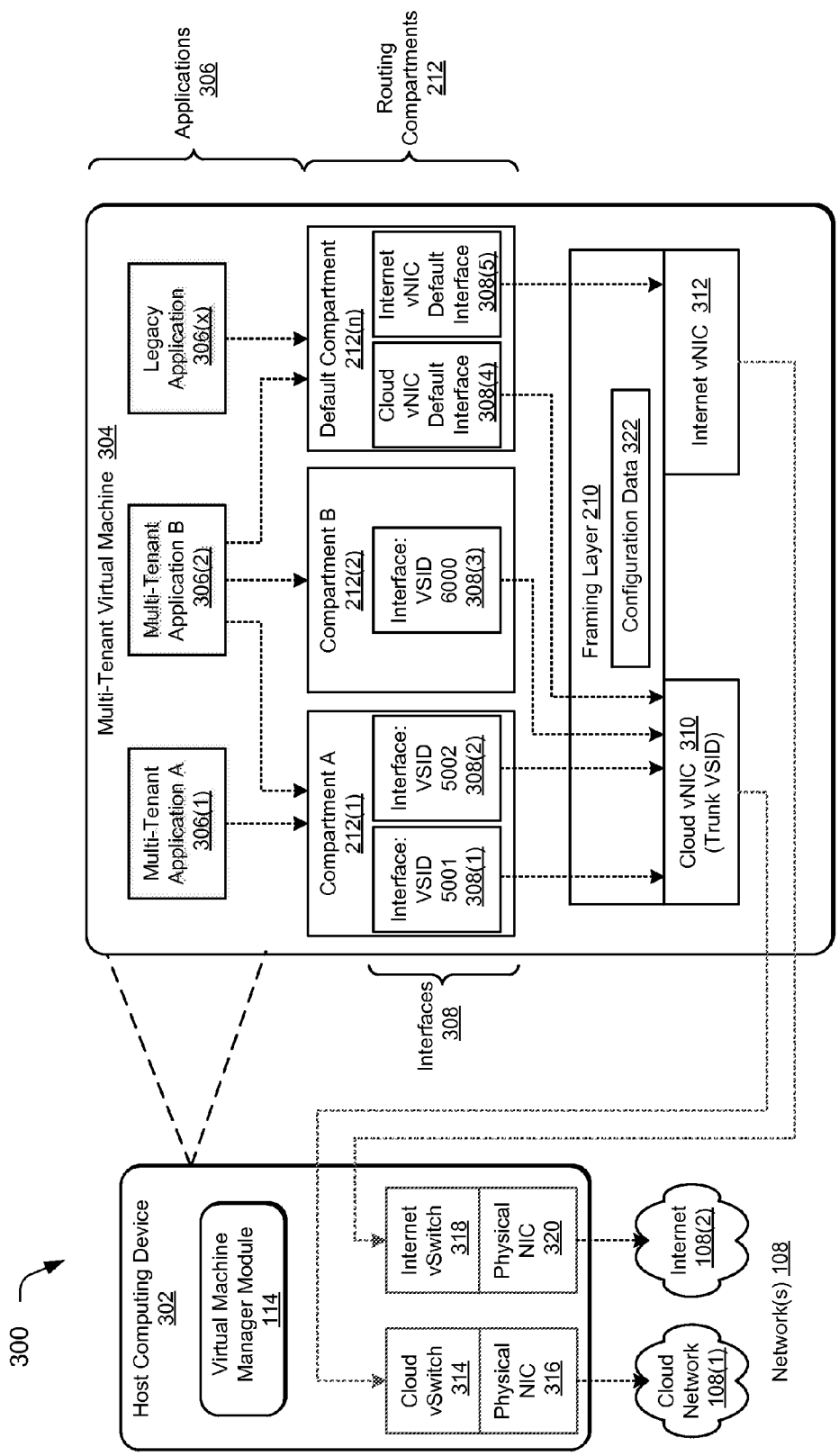
FIG. 3 is a diagram depicting an example architecture for a multi-tenant network stack in accordance with one or more implementations.

FIG. 3 depicts generally at 300 an example architecture for a multi-tenant virtual machine in accordance with one or more embodiments. The architecture is configured to support management of multiple virtual networks associated with multiple different tenants via a single instance of a virtual machine. The multiple virtual networks served by the virtual machine may employ the same or different network virtualization technologies. Each virtual machine may be configured to serve many virtual networks for tenants (e.g., routing domains) on the order of hundreds, thousands, or even more individual virtual networks.

The architecture enables multi-tenancy aware services and application that can process network I/O in the context of a particular tenant, virtual network and/or routing domain. The multi-tenant network stack implemented via the virtual machine provides isolation across different routing domains to prevent packets from being leaked unintentionally between two routing domains. Further, the architecture facilitates management of the virtual network set-up and operation for multiple tenants as well as allocation of shared services and resources including but not limited to processing system usage, network bandwidth, memory, and so forth. A multi-tenant virtual machine operates independently of the underlying virtualization scheme. For example, support may be provided for both VLAN based multi-tenancy and NVGRE based multi-tenancy as well as other comparable virtualization technologies by the same instance of a virtual machine. In addition or alternatively, different instances of a virtual machine may be created to handle different respective virtualization technologies.

As depicted in FIG. 3, a host computing device 302 may instantiate an instance of multi-tenant virtual machine 304 that implements a multi-tenant network stack. Here, the host computing device 302 may include a virtual machine manager module 114 that is multi-tenancy aware as discussed in relation to the example host computing device 102 of FIG. 1 and the example computing device 202 of FIG. 2. The virtual machine manager module 114 may operate as discussed previously to enable set-up and creation of virtual machines through the host computing device, including the example multi-tenant virtual machine 304.

Figure 4:
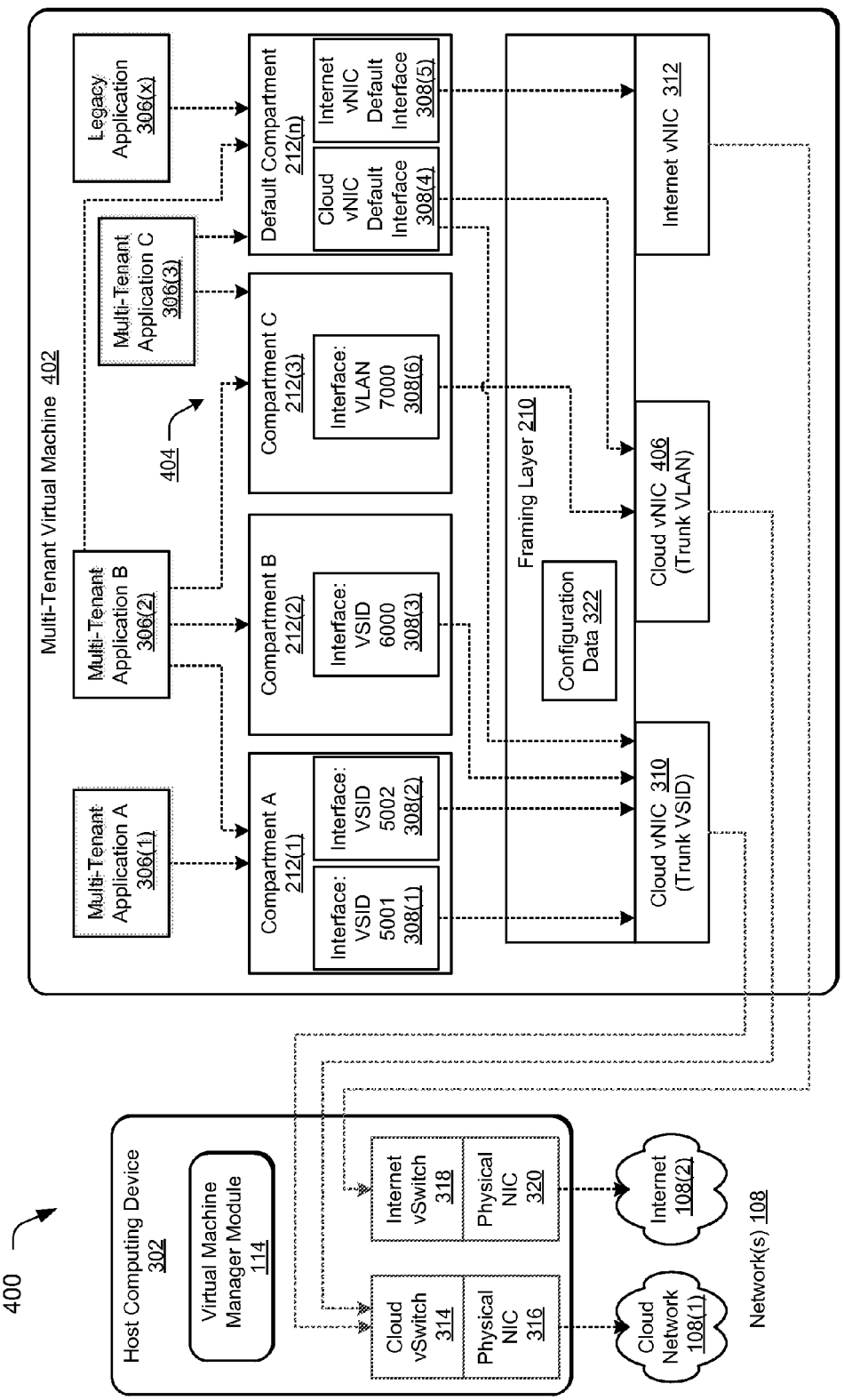
FIG. 4 is a diagram depicting another implementation of an example architecture for a multi-tenant network stack.

The multi-tenant virtual machine 304 is depicted as having a framing layer 210 and routing compartments 212 to support various applications 306. At least some of the applications 306 may be multi-tenant applications that provide services and/or processing to virtual networks associated with different tenants. Additionally, the routing compartments 212 are illustrated as including respective interfaces 308 that are created as network layer abstractions for respective virtual networks and virtual subnets. Interfaces 308 may be established for each subnet and may associated with isolation identifiers that can be used to distinguish between the interfaces and isolate traffic for the subnets, such as virtual subnet IDs (VSIDs), VLAN IDs, or other suitable isolation identifiers corresponding to different virtualization schemes. The VSIDs and VLAN IDs depicted and described in relation to FIGS. 3 and 4 are provided as illustrative examples of the more general concept of associating isolation identifiers with compartments/interfaces. In general, any suitable isolation identifiers may be employed to distinguish between and isolate the compartments/interfaces.

The example of FIG. 3 also illustrates virtual network adapters (e.g., vNICs) for the virtual machine, which include a cloud vNIC 310 and an Internet vNIC 312 to provide connectivity to a cloud network 108(1) associated with virtual network workloads and the Internet 108(2), respectively. For example, the cloud vNIC 310 may be connected to a cloud vSwitch 314 associated with a physical NIC 316 (e.g., physical interface) of the host computing device to enable access to the cloud network 108(1). The Internet vNIC 312 may be connected to an Internet vSwitch 318 associated with a physical NIC 320 (e.g., the same or a different physical interface) of the host computing device to enable access to the Internet 108(2).

The framing layer 210 may query or otherwise obtain configuration data 322 that describes topology of the virtual networks and domains that the multi-tenant virtual machine 304 is configured to serve. The configuration data 322 may be generated through interaction with the virtual machine manager module 114 and exposed to the multi-tenant virtual machine 304 via a virtual switch or otherwise. The framing layer 210 is operable to generate routing compartments 212 in accordance with the topology described by the configuration data 322. The framing layer 210 may also create interfaces 308 for the various subnets as defined by the configuration data 322. The framing layer 210 may also generate and maintain a directory, database, table, or other suitable data structure that contains information to map virtual networks to subnets and routing compartments as well as routing compartments to the interfaces. For example, the data structure may be configured to map isolation identifiers to corresponding compartments/interfaces. This data structure or mapping directory may be referenced to pass network I/O for handling to appropriate routing compartments/interfaces and to route outgoing packets to appropriate endpoints. The mapping directory or data structure may also be made available to multi-tenancy aware services and applications. The routing compartments 212, interfaces 308, and mapping information implemented via the framing layer 210 establish a mechanism to handle I/O within the context of a particular virtual network/routing domain and in isolation from traffic associated with other tenants/domains served by the multi-tenant virtual machine 304.

In the particular arrangement represented in FIG. 3, the multi-tenant virtual machine 304 is configured to serve two virtual networks/routing domains, which may correspond to tenant A and tenant B. The arrangement may be established by an administrator via a configuration dialog provided by the virtual machine manager module 114, which produces corresponding configuration data 322. The framing layer 210 then uses the configuration data 322 to create appropriate component to handle and isolate the virtual networks/routing domains. In particular, compartment A 212(1) and compartment B 212(2) may be created via the framing layer 210. In this example, the compartment A 212(1) is associated with two virtual subnets represented by VSID 5001 and VSID 5002 and compartment B is associated with one virtual subnet represented by VSID 6000. Accordingly, the framing layer 210 also creates interfaces 308(1) and 308(2) for VSID 5001 and VSID 5002 in compartment A 212(1) and interface 308(3) for VSID 6000 in compartment B 212(2). In this case, the virtual networks both employ NVGRE although a different virtualization scheme or mixed schemes may be employed as discussed above and below. A default compartment 212(n) having a default cloud interface 308(4) and a default Internet interface 308(5) may also be created to handle traffic that is not designated for a particular routing domain.

In this arrangement, multi-tenant applications may be configured to do network I/O in the context of a specific compartment as well as the default compartment. For example, FIG. 3 depicts a multi-tenant application 306(1) that may operate in the context of compartment A 212(1). Another multi-tenant application 306(2) is configured to operate in the context of compartment A 212(1), compartment B 212(2), and the default compartment 212(n). Thus, the multi-tenant application 306(2) can provide services in relation to multiple virtual networks and corresponding tenants using the routing compartment constructs to isolate the activity for the different contexts. A legacy application 306(x) (e.g., an application that is not multi-tenant aware) is able to do network I/O in the default compartment. Legacy applications may be supported via the default compartment 212(n) and operate within the multi-tenant network stack without having to make modifications to the legacy applications.

Thus, routing compartments 212 provide a mechanism for applications to do network I/O in the context of a particular compartment. Additionally, a routing compartment can be set at a session, process, thread, and/or socket level to provide variable control to the services to handle various usage scenarios. Each virtual subnet may be exposed as a separate network layer interface inside a routing compartment. The multi-tenant services and applications can then bind the socket to the IP address of a particular interface 308 inside a given routing compartment 212 to process network I/O in the context of the corresponding virtual subnet.

Moreover, the routing compartments 212 enable configuration and management of various network communication related policies, rules, and controls on an individual per compartment and/or per tenant basis. Thus, different compartments of the multi-tenant virtual machine may implement different policies, rules, and controls for handling and routing network traffic. By way of example and not limitation, firewall rules may be configured specific to a routing compartment for a tenant. In addition, bandwidth control policies and resource reservation control mechanisms such as Quality of Service (QoS) related features and controls may be implemented on a per compartment and/or per tenant basis. Additional network policies, including at least network security policies, traffic isolation policies and network monitoring policies may also be configured specific to a routing compartment for a tenant. Accordingly, the multi-tenant network stack through the various routing compartments provides a mechanism to set-up various controls and management features for handling and routing of network communication on a per compartment basis and/or per tenant basis. Moreover, these management features may be implemented via the routing compartment in a manner that is independent of the underlying virtualization technology of corresponding virtual networks.

The architecture design as just described provides multi-tenancy support that is agnostic with respect to the underlying isolation mechanism and virtualization technology. For example, a multi-tenancy configuration may expose two modes of isolation, e.g., VSID based and VLAN based. The framing layer creates routing compartments configured to handle traffic in a corresponding isolation mode. The framing layer may also be configured to distinguish between packets that use different isolation modes based on isolation identifiers and direct the packets to appropriate components for processing accordingly. This approach makes it possible for the system to support both VSID and VLAN based isolation solutions. Moreover, the same virtual machine may be configured to include compartments for both virtual networks that used NVGRE/VSID based isolation and VLAN based isolation. Support for other virtualization schemes in addition to NVGRE/VSID and VLAN may be provided in a comparable manner. Thus, the architecture is independent of and may be extensible with respect to the virtualization technologies used for the underlying virtual networks.

For instance, FIG. 4 depicts generally at 400 an example implementation of the architecture for a multi-tenant virtual machine in which multiple virtualization technologies are employed. In this example, a multi-tenant virtual machine 402 is depicted that may be instantiated via a host computing device 302 as in the example of FIG. 3. The example of FIG. 4 is similar to the example in FIG. 3 except that an additional routing compartment is included as shown generally at 404. In particular, compartment C 212(3) is illustrated as being included. The compartment C 212(3) may correspond to a tenant C. Compartment C 212(3) includes an interface 308(6) for a VLAN based virtual network that may be identified by a VLAN ID 7000. An additional multi-tenant application 306 (3) that can operate in the context of compartment C 212(3) as well as the default compartment 212(n) is also represented. Further, the multi-tenant virtual machine 402 may include a cloud vNIC 406 for VLAN based traffic in addition to the vNICs discussed in relation to FIG. 3.

The other compartments, compartment A 212(1) and compartment B 212(2), are also provided to support tenant A and tenant B respectively. These compartments correspond to VSID based networks and have corresponding VSIDs as discussed in relation to FIG. 3. Thus, in the example of FIG. 4 three different tenants are serviced by the multi-tenant virtual machine 402. Virtual networks corresponding to compartment A 212(1) and compartment B 212(2) employ VSID based virtualization whereas the virtual networks corresponding to compartment C 212(3) employs VLAN based virtualization. It should be noted that compartments may also contain interfaces that are related to different virtualization technologies. In other words compartments are not necessarily tied to a single virtualization technology. Individual interfaces within the compartments though generally do correspond to a specific virtualization technology employed for an associated virtual network. For example, a compartment may have two interfaces, one interface with a VSID sitting on a trunk VSID vNIC and another interface with a VLAN ID sitting on a trunk VLAN vNIC. Accordingly, the virtualization technology employed for interfaces within a single compartment may be different between the interfaces. In this manner, the multi-tenant virtual machine 402 may support multiple types of virtualization and creates components (e.g., compartments and interfaces) to handle and isolate the traffic accordingly.

Note that some multi-tenant application may work across compartments corresponding to different virtualization technologies. In effect, these applications may act as gateways between the different virtualization technologies. The applications though do not have to be aware of the virtualization technologies or even be aware that they are acting as a gateway. An example of such a cross virtualization technology application is represented in FIG. 4 by multi-tenant application 306(2), which in this scenario may operate in the content of compartments 212(1) and 212(2), which correspond to virtual networks that employ NVGRE virtualization as well as compartment 212(3), which corresponds to a virtual network that employs VLAN virtualization.

Procedures

Figure 5:
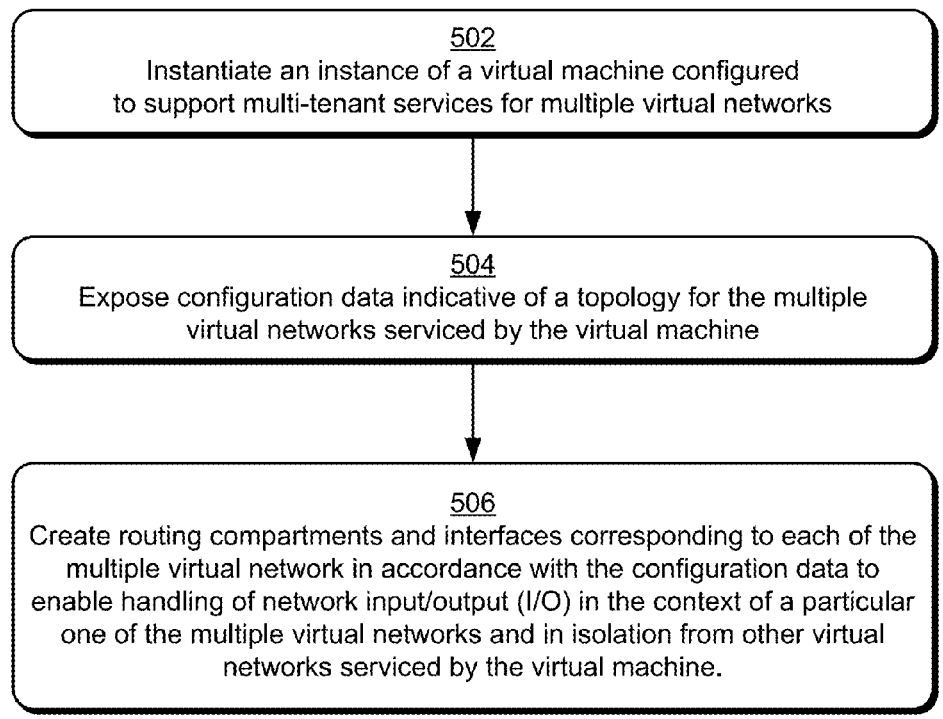
FIG. 5 is a flow diagram depicting an example procedure for instantiation of a multi-tenant network stack in accordance with one or more implementations.

FIG. 5 is a flow diagram depicting a procedure 500 for instantiation of a multi-tenant network stack in accordance with one or more implementations. An instance of a virtual machine configured to support multi-tenant services for multiple virtual networks is instantiated (block 502). This may occur in any suitable way. In one approach, a host computing device 302 may be configured to implement a virtual machine that is multi-tenant aware. To do so, the host may include or make use of a virtual machine manager module 114 as described herein. In particular, the virtual machine manager module 114 may provide a virtual switch 216 that facilitates creation and management of virtual machines including virtual machines configured to implement a multi-tenant aware stack as described in relation to FIGS. 3 and 4. The virtual machine instance may be executed by the host computing device. In other words the virtual machine is "hosted" by the host computing device. As mentioned, a particular host may provide multiple virtual machines. Moreover, each individual virtual machine instance may be configured to multiple tenants and corresponding virtual networks.

Configuration data is exposed that is indicative of a topology for the multiple virtual networks serviced by the virtual machine (block 504). For example, the virtual machine manager module 114 may expose configuration data 322 to a virtual machine in any suitable way. In one approach, the configuration data may be contained in a configuration file or database maintained by the virtual machine manager module 114 and/or a virtual switch implemented by the virtual machine manager module 114. A virtual machine may query the configuration file to obtain the data indicative of the network topology. In addition or alternatively, the virtual machine manager module 114 may populate the configuration data 322 to virtual machines when the data is created or updated. Various other techniques to enable discovery by virtual machines of configuration data 322 and/or other suitable information that defines the network topology are also contemplated. In an implementation, a framing layer 210 of the virtual may interact with the virtual machine manager module 114 to obtain the configuration data 322 to a virtual machine in any suitable way. In one approach, the configuration data as discussed previously herein.

Routing compartments and interfaces corresponding to each of the multiple virtual networks are created in accordance with the configuration data to enable handling of network input/output (I/O) in the context of a particular one of the multiple virtual networks and in isolation from other virtual networks serviced by the virtual machine (block 506). In particular, the framing layer 210 or comparable functionality may be configured to form routing compartments 212 and interfaces 308 based upon configuration data 322 that is queried, supplied by a virtual switch, or otherwise accessed. Each tenant serviced by a multi-tenant virtual machine may be associated with a corresponding virtual network or routing domain. Routing compartments and interfaces are created to isolate each tenant, virtual network, and virtual subnet from other tenants, networks, and domains. Isolation identifiers associated with each of the compartments and interfaces may then be employed to direct I/O to appropriate endpoints and processing components. Multi-tenant applications and services may listen for traffic on particular virtual networks using the compartments and interfaces that are constructed. This enables the applications/service to process network I/O in the context of a particular network or tenant. Additionally, traffic and processing for each of the different virtual networks serviced by the virtual machine is isolated from traffic and processing for other virtual networks using the constructs.

FIG. 6 is a flow diagram depicting an example procedure for routing packets in a multi-tenant network stack in accordance with one or more implementations. A packet is received that is routed from a virtual switch to an instance of virtual machine configured to support multi-tenant services for multiple virtual networks (block 602). Then, the packet is parsed to ascertain an identifier indicative of a particular virtual network of the multiple virtual networks serviced by the virtual machine (block 604). For example, a packet may be forwarded by a virtual switch to a particular virtual machine. The framing layer 210 of the virtual machine may operate to process the incoming packet and route the packet to an appropriate compartment. The routing may be based upon various identifiers contained by the packet. For instance headers of the packets may be indicative of a VSID, VLAN ID, or other isolation identifier. The framing layer 210 may use these identifiers as a basis for performing multiplex or de-multiplex operations (MUX/DEMUX) on the packets. The framing layer may therefore process packets that are received to detect isolation identifiers indicative of the particular virtual networks and employ the isolation identifier to route traffic.

In particular, an interface of a routing compartment corresponding to the particular virtual network configured for handling of the packet in isolation from other virtual networks serviced by the virtual machine is determined based upon the identifier (block 606). As mentioned, the framing layer 210 may maintain a directory or other suitable mapping data structure to map the isolation identifiers to corresponding compartments and interfaces. Thus, the framing layer 210 may use the VSIDs or VLAN IDs associated with packets to perform a look-up on the directory/mapping data structure to ascertain an appropriate compartment and/or interface for handling the packet. The framing layer is able to determine the correct interface/routing compartment combination based upon the look-up. Then, the packet is directed for handling via the interface within the routing compartment (block 608).

Having considered some example details of a multi-tenant network stack, consider now a discussion of an example system and device to implement various aspects in accordance with one or more embodiments.

Example System and Device

Figure 7:
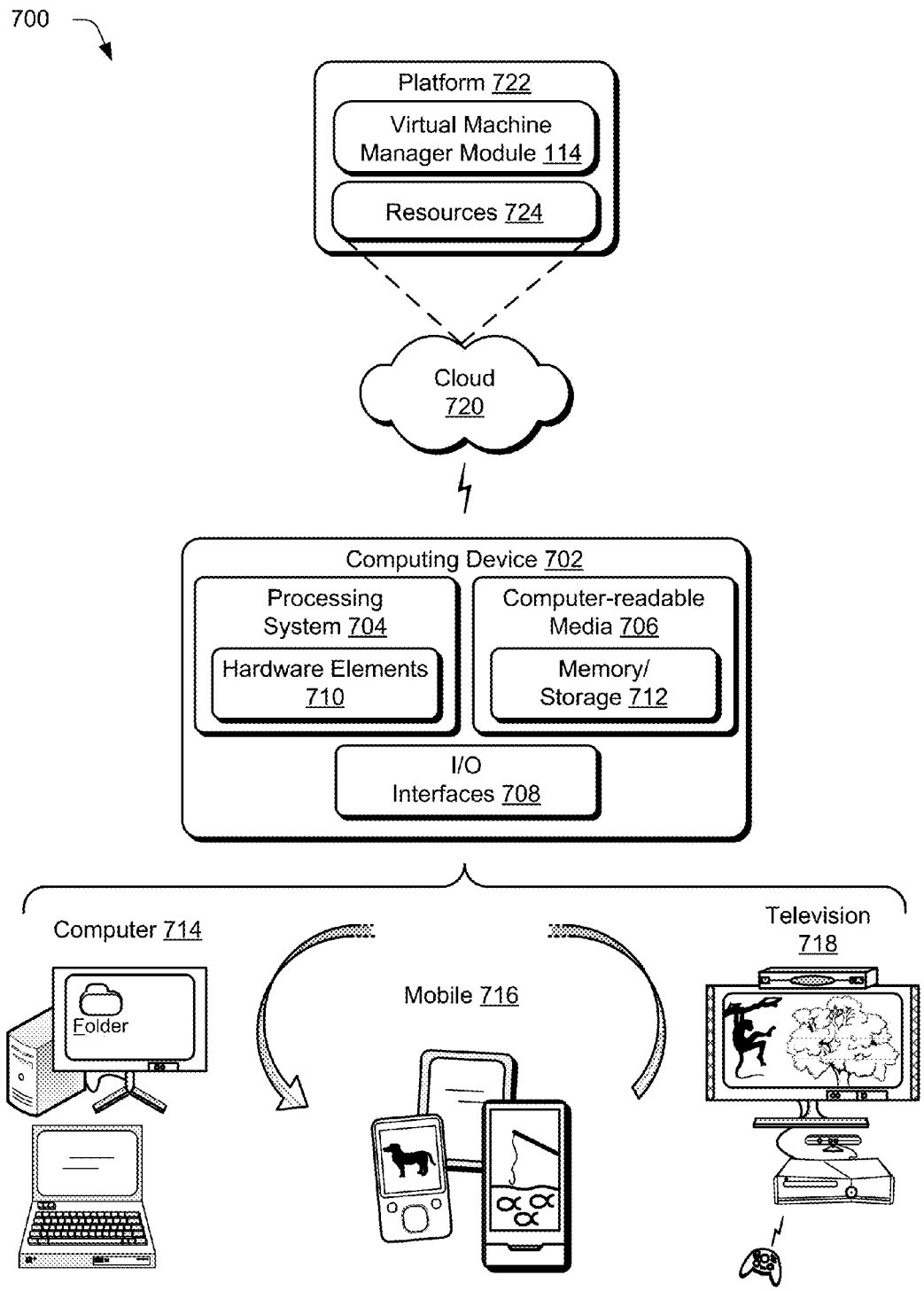
FIG. 7 illustrates various an example system that can be employed to implement aspects of the techniques described herein.

FIG. 7 illustrates an example system generally at 700 that includes an example computing device 702 that is representative of one or more computing systems and/or devices that may implement the various techniques described herein. The computing device 702 may be, for example, a server of a service provider, a host in a virtual network environment, a device associated with the client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 702, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 110, applications 112, virtual machine manager module 114, virtual switch 216, framing layer 210, routing compartments 212, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, the functionality of the virtual machine manager module 114 and other modules may also be implemented all or in part through use of a distributed system, such as over a "cloud" 720 via a platform 722 as described below. The virtual machine manager module 114 may also be implemented by a host device of the platform, such as by one or more servers of a datacenter. The virtual machine manager module 114 may also be implemented by an individual computing device 702 or host as described herein The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network. The service may include virtualization services and multi-tenant services implemented via a suitably configured virtual machine manager module 114.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to provide network services to multiple tenants using isolated compartments and interfaces constructed for multiple virtual networks via a single instance of a virtual machine, the method comprising:
    instantiating an instance of a virtual machine to support multi-tenant services for multiple virtual networks including at least Virtual Local Area Network (VLAN) based virtualization;
    exposing configuration data indicative of a topology for the multiple virtual networks serviced by the virtual machine;
    creating routing compartments and interfaces using a framing layer of the virtual machine, the routing compartments and interfaces created to correspond to each of the multiple virtual networks as indicated by the configuration data to enable handling of network input/output (I/O) in the context of a particular one of the multiple virtual networks and in isolation from other virtual networks serviced by the virtual machine;
    associating isolation identifiers with the routing compartments and interfaces to form a data structure that is maintained by the framing layer and maps the isolation identifiers to associated routing compartments, the isolation identifiers used to distinguish between and isolate traffic for different compartments and interfaces; and
    selectively routing network I/O via the routing compartments and interfaces for provision of at least one network service or application, the network I/O routed to compartments and interfaces using the isolation identifiers to match packets to corresponding compartments and interfaces created to handle the packets, including parsing the packets to obtain corresponding isolation identifiers and using the isolation identifiers to look-up routing compartments for the packets designated via the data structure.

2. A method as described in claim 1, wherein the routing compartments are configured as network layer abstractions of state information for each of the virtual networks serviced by the virtual machine.

3. A method as described in claim 1, wherein the configuration data is exposed via a virtual switch of the computing device configured to host the virtual machine.

4. A method as described in claim 1, wherein the framing layer is configured to obtain the configuration data indicative of topology.

5. A method as described in claim 1, wherein the routing compartments are isolated from each other and provide a mechanism for applications of the virtual machine to process the network I/O in the context of a specific virtual network.

6. A method as described in claim 1, wherein the virtual machine is configured to provide services and applications through the routing compartments that are accessible by the multiple tenants independent of virtualization technology employed for the multiple virtual networks corresponding to the multiple tenants.

7. A method as described in claim 1, wherein the configuration data indicative of topology for at least one of the virtual networks is produced by a virtual machine manager module of the computing device responsive to receiving input via a configuration dialog output by the virtual machine manager module.

8. A method as described in claim 1, wherein the virtual machine supports multiple different virtualization technologies.

9. A method as described in claim 8, wherein the multiple different virtualization technologies include at least Network Virtualization using Generic Routing Encapsulation (NVGRE) based virtualization and the VLAN-based virtualization.

10. A method as described in claim 1, wherein the interfaces correspond to subnets of the virtual networks described by the configuration data indicative of the topology.

11. A method as described in claim 1, wherein creating the routing compartments comprises creating at least two routing compartments for the virtual machine associated with different virtualization technologies employed for corresponding virtual networks.

12. A system to provide network services to multiple tenants using isolated compartments and interfaces constructed for multiple virtual networks via a single instance of a virtual machine, the system comprising:
    one or more processors; and
    a memory having stored thereon computer-readable instructions that are executable by the one or more processors implement a framing layer of the single instance of the virtual machine to perform operations comprising:
    receiving a packet that is routed from a virtual switch to the single instance of the virtual machine, the virtual machine supporting multi-tenant services for multiple virtual networks including at least Virtual Local Area Network (VLAN) based virtualization;
    parsing the packet to ascertain an isolation identifier indicative of a particular virtual network of the multiple virtual networks serviced by the virtual machine, the isolation identifier associated with routing compartments and interfaces created by the framing layer to correspond to the particular virtual network to handle network input/output (I/O) in the context of the particular virtual network and in isolation from other virtual networks serviced by the virtual machine, each of the multiple virtual networks having corresponding routing compartments and interfaces that are created by the framing layer and associated with isolation identifiers to form a data structure that maps the isolation identifiers to associated routing compartments, the data structure enabling the framing layer to distinguish between and isolate traffic for different compartments and interfaces;

determining based upon the isolation identifier an interface of a routing compartment corresponding to the particular virtual network, including using the isolation identifier to look-up the routing compartment for the packet designated via the data structure; and directing the packet for handling via the interface within the routing compartment effective to selectively route network I/O for provision of at least one network service or application.

13. A system as described in claim 12, wherein the operations further comprise:

obtaining configuration data indicative of a topology for the multiple virtual networks serviced by the virtual machine; and creating multiple routing compartments indicated by the configuration data to enable handling of network I/O in the context of a particular one of the multiple virtual networks.

14. A system as described in claim 13, wherein the multiple routing compartments are configured to contain interfaces corresponding to each subnet of the multiple virtual networks.

15. A system as described in claim 13, wherein the multiple routing compartments are configured to implement management features for network communication on a per compartment basis including one or more of firewall rules, bandwidth control policies, network security policies, traffic isolation policies, or network monitoring policies.

16. A system as described in claim 12, wherein the virtual machine includes one or more multi-tenant applications configured to listen to traffic in multiple routing compartments of the virtual machine and employ the multiple routing compartments to perform work in the context of corresponding virtual networks in isolation from other virtual networks.

17. A computing device comprising:

a processing system; and one or more modules executable via the processing system to implement a single instance of a virtual machine to provide network services to multiple tenants using isolated compartments and interfaces that are constructed for multiple virtual networks by the single instance of the virtual machine and use at least Virtual Local Area Network (VLAN) based virtualization, the virtual machine including:

a framing layer to:

obtain configuration data indicative of a topology for the multiple virtual networks serviced by the virtual machine;

create routing compartments and interfaces to correspond to each of the multiple virtual networks as indicated by the configuration data to enable handling of network input/output (I/O) in the context of a particular one of the multiple virtual networks and in isolation from other virtual networks serviced by the virtual machine;

associate isolation identifiers with the routing compartments and interfaces, the isolation identifiers used to distinguish between and isolate traffic for different compartments and interfaces; and maintain a data structure that maps the isolation identifiers to associated routing compartments;

the routing compartments and interfaces created via the framing layer that isolates the traffic for the multiple virtual networks using the isolation identifiers to match packets to corresponding compartments and interfaces created to handle the packets by parsing the packets to obtain corresponding isolation identifiers and using the isolation identifiers to look-up routing compartments for the packets designated via the data structure; and one or more multi-tenant applications that utilize the routing compartments and interfaces to perform work in the context of the multiple virtual networks.

18. The computing device of claim 17, wherein each of the routing compartments corresponds to one of multiple different tenants serviced by the single instance of the virtual machine.

19. The computing device of claim 17, wherein the single instance of the virtual machine supports multiple different virtualization technologies including at least the VLAN-based virtualization and Network Virtualization using Generic Routing Encapsulation (NVGRE) based virtualization.

20. The computing device of claim 19, wherein the framing layer is further configured to receive a packet that is routed to the single instance of the virtual machine, parse the packet to ascertain an identifier indicative of a particular one of the multiple virtual networks, reference the data structure to perform the look up, and direct the packet for handling within a particular routing compartment determined according to the look-up.

* * * * *